ELISHA T. COBB.
Improvement in Flower Stands.

No. 118,844.

Patented Sep. 12, 1871.

Witnesses.

Elisha T. Cobb.
by his attorney 118,844

UNITED STATES PATENT OFFICE.

ELISHA T. COBB, OF CONWAY, MASSACHUSETTS.

IMPROVEMENT IN FLOWER-STANDS.

Specification forming part of Letters Patent No. 118,844, dated September 12, 1871.

*To all whom it may concern:*

Be it known that I, ELISHA T. COBB, of Conway, of the county of Franklin of the State of Massachusetts, have invented a new and useful or Improved Jardiniere; and do hereby declare the same to be fully described in the following specification and represented in the accompanying drawing, of which—

Figure 1:
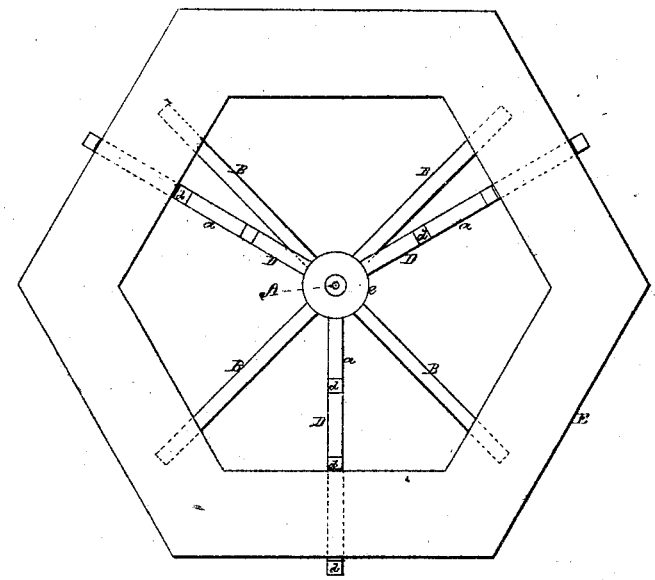
Figure 2:
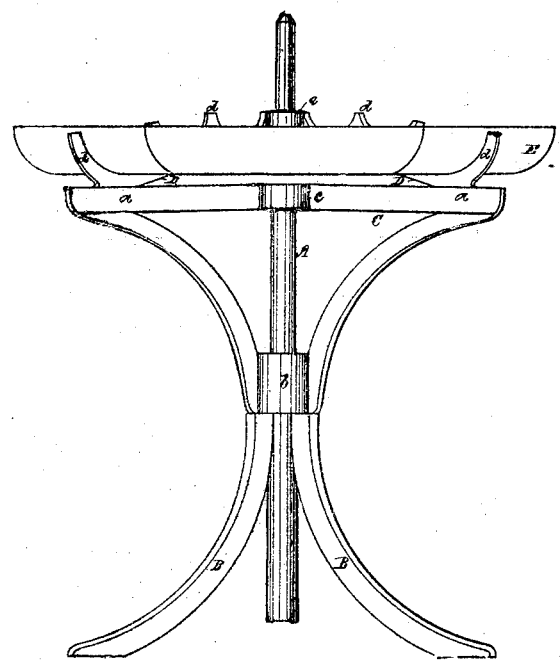
Figure 3:
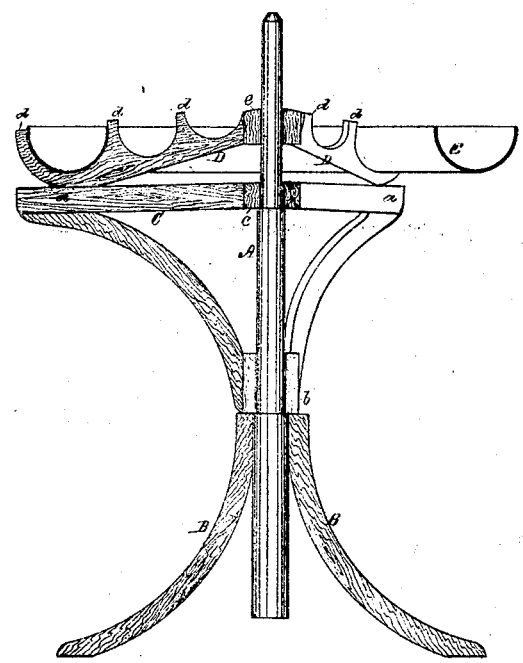

Figure 1 is a top view, Fig. 2 a front elevation, and Fig. 3 a vertical section of it.

The nature of my invention consists in the combination of a hub and series of inclined racks with a rotary stand, applied to a supporting-spindle provided with legs, as hereinafter explained the purpose of the invention being to support a series of endless troughs and enable such to be revolved, and access to be had to them with ease, as occasion may require, for supplying such troughs with earth or plants, or for attending to or watering such plants, as circumstances may require.

In such drawing, A denotes a spindle, supported by a series of legs, B B B B, extended from it in manner as represented. There is arranged on this spindle, so as to freely revolve on it, a frame, C, composed of three horizontal radial arms, $a\ a\ a$, two hubs, $b\ c$, and a series of curved struts, $d\ d\ d$, arranged together in manner as shown. Above the hub $c$ is an auxiliary hub, $e$, from which three inclined racks, D D D, formed as represented, are extended, in manner as shown, down to and rest upon and are fastened respectively to the arms $a\ a\ a$. The racks are for supporting a series of circular or polygonal troughs, E, for holding earth and plants arranged therein, the troughs being concentric with each other, and each being disposed somewhat above the next surrounding it, whereby a pleasing effect is given to the whole while the plants are growing, and access to the inner troughs may be more easily had than would be the case were all on a level.

I claim—

The combination of the hub $e$ and its series of inclined racks D with the troughs E, the rotary stand or frame C, and the standard or spindle A, and series of legs B, all being constructed and arranged as and for the purpose specified.

ELISHA T. COBB.

Witnesses:
H. W. BILLINGS,
E. R. COBB.